United States Patent [19]

Graser

[11] 4,438,843

[45] Mar. 27, 1984

[54] WRAP-AROUND STYLE BEVERAGE BOTTLE CARRIER WITH FULLY INTEGRATED PRODUCT SEPARATION MEANS

[75] Inventor: Earl J. Graser, Monroe, La.

[73] Assignee: Manville Service Corp., Denver, Colo.

[21] Appl. No.: 349,893

[22] Filed: Feb. 18, 1982

[51] Int. Cl.³ .............................................. B65D 75/00
[52] U.S. Cl. .................................... 206/148; 206/156;
206/427; 229/52 BC; 229/28 BC
[58] Field of Search ............... 206/156, 145, 146, 147,
206/148, 151, 427, 434; 229/52 BC, 28 BC, 89

[56] References Cited

U.S. PATENT DOCUMENTS

| 2,911,096 | 11/1959 | Andre | 206/434 |
| 3,963,121 | 6/1976 | Kipp | 206/434 |
| 3,963,170 | 6/1976 | Wood | 206/434 |
| 3,994,432 | 11/1976 | Kirby, Jr. | 206/427 |
| 4,164,286 | 8/1979 | Sutherland | 206/434 |
| 4,234,081 | 11/1980 | Champlin | 206/147 |
| 4,314,640 | 2/1982 | Manizza | 206/434 |
| 4,326,628 | 4/1982 | Wood | 206/427 |
| 4,328,891 | 5/1982 | Elward | 206/147 |
| 4,381,057 | 4/1983 | Carver | 206/434 |

*Primary Examiner*—Joseph Man-Fu Moy
*Attorney, Agent, or Firm*—Ronald M. Halvorsen; John D. Lister

[57] ABSTRACT

An improved wrap-around beverage carrier for a plurality of bottles having a unique, fully integrated product separation means formed as a part of the carrier. The separation means is formed as a combination of an upper product separation means and a lower product separation means with the upper product separation means being formed from two adjacent panels hingedly attached together and folded in the manner shown in the drawings. The lower product separation means comprises a plurality of upwardly turned tabs positioned between the bottles to provide both longitudinal and transverse separation.

4 Claims, 5 Drawing Figures

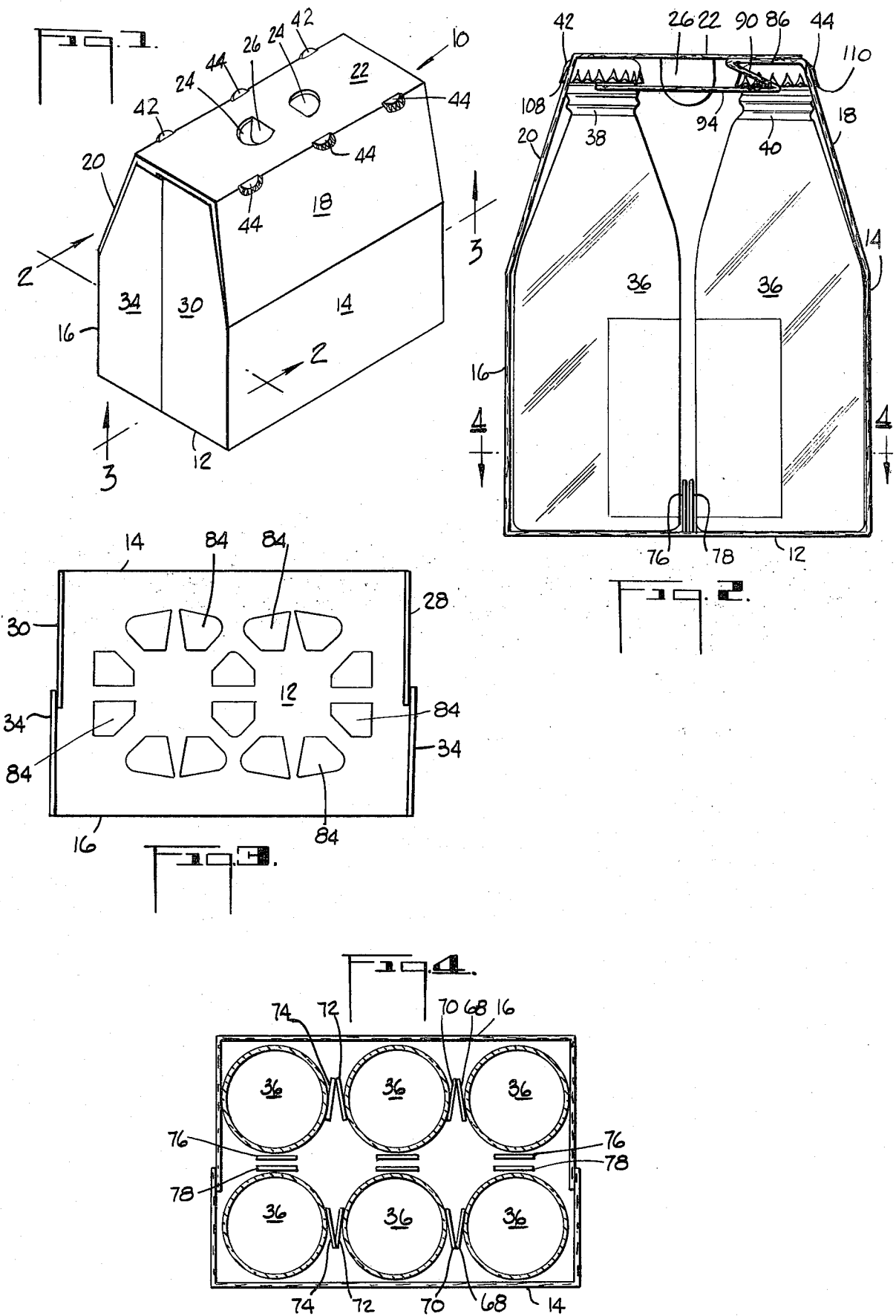

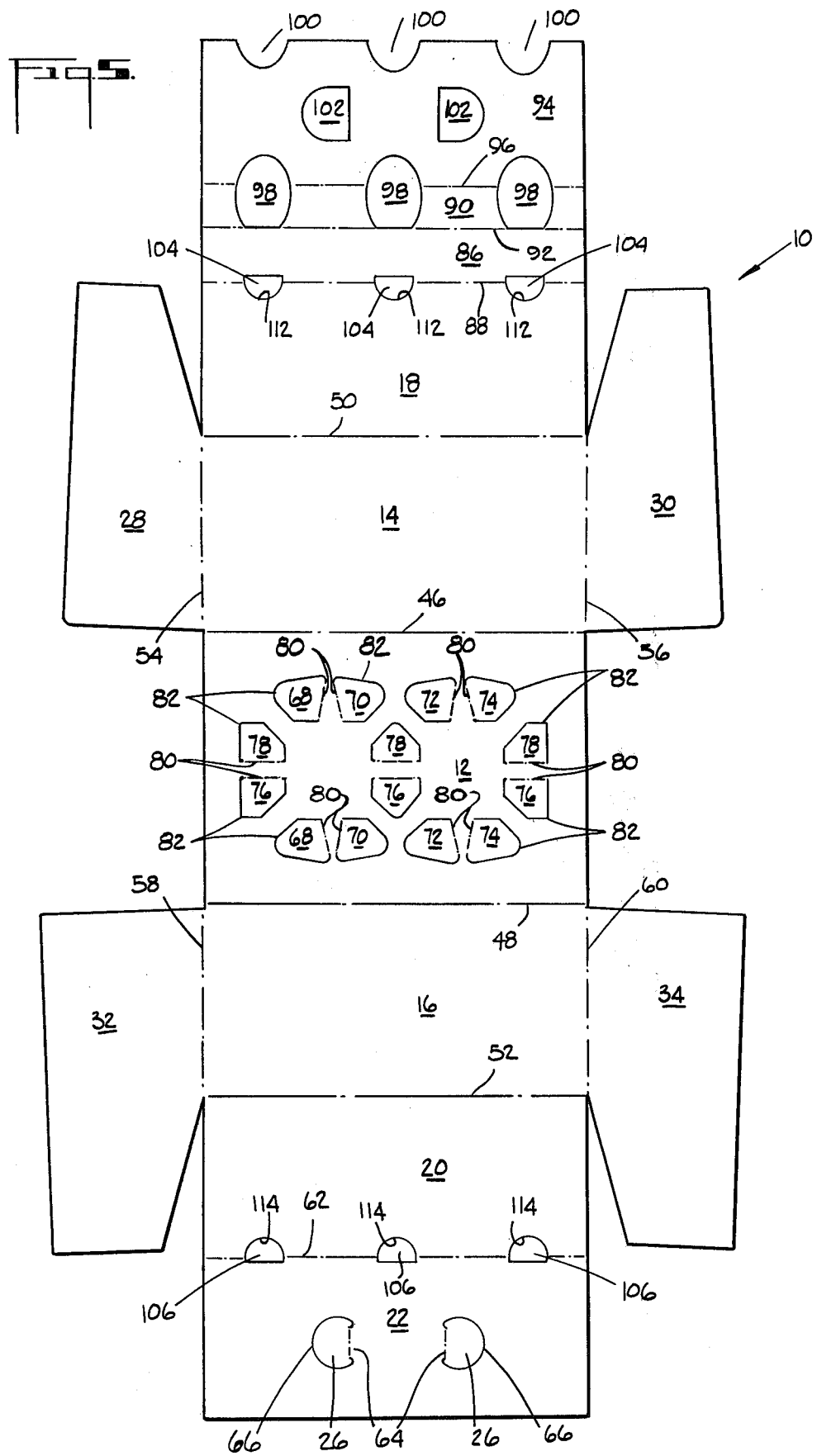

WRAP-AROUND STYLE BEVERAGE BOTTLE CARRIER WITH FULLY INTEGRATED PRODUCT SEPARATION MEANS

BACKGROUND OF THE INVENTION

This invention relates to beverage bottle carriers in general and in particular to a new and novel wrap-around style beverage bottle carrier having fully integrated product separation means incorporated within the carrier production blank.

In a wrap-around style bottle carrier of the type encompassed by the subject invention, there is generally included within the carrier means for separating the plurality of bottles packaged within the carrier. The separation means generally comprises a separate partition unit which is inserted between adjacent bottles in a packaging machine prior to the bottle carrier production blank being wrapped around the grouping of bottles desired. Other means of product separation include elongated production blanks having partitions formed out of the production blank with butterfly separators being formed within the partition units which are all inserted by the packaging machine within and around the grouping of bottles.

Such prior art type product separation means have the disadvantage of requiring either separate feeder mechanisms for the separate bottle partition unit or else require unusually long production blanks which are costly to produce.

SUMMARY OF THE INVENTION

In order to overcome the problems previously described relating to prior art type devices, there is incorporated by the Applicant's invention a new and novel wrap-around type bottle carrier having fully integrated product separation means contained within the carrier. The product separation means comprises an upper product separation means which is hingedly attached to a partial inner top panel and has formed thereon a plurality of openings for receiving the caps and the necks of the bottles to be contained in the carrier to separate them both longitudinally and transversely. There is also incorporated in the Applicant's carrier a lower product separation means which is attached to the bottom panel and is designed to be positioned vertically between the bottles to be contained in the carrier in order to provide both longitudinal and transverse bottle separation.

The upper product separation means may be formed as a folded two panel separator hingedly attached to the partial inner top panel and the lower product separation means may be formed as a plurality of hinged tabs folded vertically upward between the bottles to be positioned in the carrier.

Accordingly, it is an object and advantage of the invention to provide a new and improved wrap-around beverage style bottle carrier of a one-piece construction having a fully integrated product separation means contained within the carrier production blank.

Another object and advantage of the invention is to provide a production blank for a wrap-around style beverage bottle carrier utilizing minimal amounts of paperboard and yet having fully integrated product separation means contained within the carrier structure.

These and other objects and advantages of the invention will become apparent from a review of the specification and from a study of the drawings showing the invention.

BRIEF DESCRIPTION OF THE DRAWINGS

FIG. 1 is a perspective view of the Applicant's wrap-around beverage bottle carrier showing the carrier glued with a plurality of bottles contained in the carrier;

FIG. 2 is a sectional view, taken along line 2—2 of FIG. 1, showing the Applicant's upper product separation means receiving the caps and necks of the bottles contained in the carrier and also showing the lower product separation means separating adjacent bottles in the carrier;

FIG. 3 is a bottom plan view, taken along line 3—3 of FIG. 1, showing the lower product separation means formed in the bottom panel of the carrier;

FIG. 4 is a sectional view, taken along line 4—4 of FIG. 2, showing the positioning of the lower product separation means between adjacent bottles in the carrier in order to provide both longitudinal and transverse bottle separation; and FIG. 5 is a plan view of the production blank of the Applicant's carrier showing the formation of the upper product separation means and the lower product separation means as will be described more fully hereinafter.

DESCRIPTION OF THE PREFERRED EMBODIMENT

Referring now to FIG. 1 of the drawing, there is shown the Applicant's wrap-around beverage carrier shown generally by the numeral 10 which comprises a bottom panel 12, a pair of vertical first side panels 14 and 16 and a pair of sloped second side panels 18 and 20.

An outer top panel 22 is hinged off of the sloped second side panel 20 and contains a plurality of handle openings 24 formed by means of a plurality of handle tabs 26 turned down within the interior of the carrier.

In the embodiment shown in FIG. 1 the wrap-around carrier also has formed thereon on the vertical first side panels 14 and 16 a plurality of end panels 28, 30, 32 and 34. In the FIG. 1 view, it can be seen that the end panels 30 and 34 are overlapped and are adhesively secured together while the end panels 28 and 32 would be overlapped and adhesively secured together in a similar manner although they are not shown in FIG. 1. These end panels can be seen more clearly in FIG. 5 of the drawing.

When formed thusly, the carrier 10 is designed to enclose a plurality of bottles 36 having bottle necks 38 and 40, as seen in FIG. 2 of the drawing and having a plurality of bottle caps 42 and 44 positioned on the bottle necks.

By referring now to FIG. 5 of the drawing, there can be seen the production blank for forming the package shown in FIG. 1 which will be described in greater detail before referring to FIG. 2 showing the interior fully integrated product separation means. In FIG. 5, it can be seen how the vertical first side panel 14 is hingedly attached to the bottom panel 12 by means of the score line 46 and in a similar manner, the vertical first side panel 16 is hingedly attached to the same bottom panel 12 by means of the score line 48. It can also be seen how the sloped second side panel 18 is hingedly connected to the vertical first side panel 14 by means of the score line 50 and in a similar manner, the sloped second side panel 20 is hingedly attached to the vertical first side panel 16 by means of the score line 52.

The end panels 28 and 30 are hingedly attached to the vertical first side panel 14 by means of the score lines 54 and 56 and in a similar manner, the end panels 32 and 34 are hingedly attached to the vertical first side panel 16 by means of the score lines 58 and 60. It is within the spirit and scope of the invention that the Applicant's new and novel fully integrated wrap-around bottle carrier may be formed with different end panel construction than shown in the drawing which has been given by way of a preferred embodiment only. It is within the spirit and scope of the invention that tuck-in end panels, partial end panels and other variations may also be used in the carrier should it be desired by the customer.

The Applicant's carrier contains an outer top panel 22 which is hingedly attached to the sloped second side panel by means of the score line 62 and the outer top panel 22 contains the before-described handle tabs 26 which are hingedly connected to the outer top panel 22 by means of the score line 64 in combination with the die cut 66 forming the handle tab which is positioned vertically downwardly to form the handle opening 24 shown in FIG. 1 of the drawing.

As has been before-mentioned, the Applicant'new and improved wrap-around bottle carrier contains a lower product separation means attached to and formed in the bottom panel 12 which is designed to be positioned vertically between the bottles 36 to be contained in the carrier. The lower product separation means comprises a plurality of tabs 68 and 70 and a plurality of tabs 72 and 74 formed in the bottom panel 12. The tabs 68 and 70 are utilized for providing product separation between adjacent bottles and in the transverse direction on one side of the carrier and the tabs 72 and 74 are utilized to provide longitudinal separation between adjacent bottles in the transverse direction on the opposite side of the carrier.

In a similar manner, the bottom panel also contains a plurality of tabs 76 and 78 which are utilized to provide longitudinal separation along the center line of the carrier with the tab 76 forming product separation on one longitudinal side of the carrier and the tab 78 forming product separation on the other longitudinal side of the carrier. The tabs 68, 70, 72, 74, 76 and 78 are formed by means of a plurality of score lines 80 in combination with a plurality of die cuts 82 to form the respective tabs. It can be seen by referring to FIG. 2 and FIG. 3 of the drawing and also to FIG. 4 how the tabs 68, 70, 72, 74, 76 and 78 are utilized to provide the lower product separation means. For example, it can be seen in FIG. 3, which is a bottom plan view, taken along line 3—3 of FIG. 1, how the various tabs are turned upwardly into the interior of the carrier to provide a plurality of openings 84 formed in the bottom panel 12 of the carrier. By referring to FIG. 2 and FIG. 4, there can also be seen how the upwardly turned tabs are utilized to provide the lower product separation means of the carrier which is fully integrated into the carrier bottom panel 12. For example, in FIG. 2 it can be seen how the tab 76 and 78 have been turned upwardly to provide separation in the longitudinal direction between the bottles 36. In a similar manner, it can be seen by referring to FIG. 4 how the respective tabs are utilized to separate the bottles both in the longitudinal and in the transverse direction. It can be seen that the tabs 76 and 78 are utilized to separate the adjacent row of three bottles in the longitudinal direction while the tabs 68 and 70 are utilized to separate the adjacent row of two bottles in the transverse direction and the tabs 72 and 74 are utilized to separate another adjacent row of two bottles in the transverse direction.

The various tabs 68, 70, 72, 74, 76 and 78 are turned upwardly out of the bottom panel 12 by means of fingers utilized in the packaging machine which is designed for folding the Applicant's beverage carrier around the plurality of bottles.

Referring now to FIGS. 2 and 5 of the drawings, there will be described in greater detail the upper product separation means of the Applicant's invention. The sloped second side panel 18 has hingedly attached thereto a partial inner top panel 86 which is hingedly attached to the sloped second side panel 18 by means of the score line 88. The upper product separation means is formed as a two panel separator which is hingedly attached to the partial inner top panel 88 and comprises an elongated panel 90 hingedly attached to the partial inner top panel 86 by means of the score line 92 and also comprises a generally horizontally positioned panel 94 hingedly attached to the elongated panel 90 by means of the score line 96. When formed thusly, it can be seen that the upper product separation means comprises the combination of the elongated panel 90 and the panel 94. The horizontally positioned panel 94 contains a plurality of oval-shaped holes 98 and a plurality of cut-outs 100 formed in a semi-circular shape. The oval-shaped holes 98 are formed partially in the generally horizontally positioned panel 94 and partially in the elongated panel 90. The panel 94 also contains a plurality of cut-outs 102 which are positioned below the handle openings 24 whenever the carrier is erected.

By referring to FIG. 2 of the drawing, it can be seen how the upper product separation means is utilized to separate the upper portion of the bottles 36 contained in the carrier. Whenever the carrier is erected, it can be seen in FIG. 2 how the partial inner top panel 86 would be adhesively secured to a portion of the outer top panel 22. The elongated panel 90 would be bent along the score line 92 to the downwardly inclined position shown in FIG. 2 and would also be bent in the opposite direction along the score line 96 to allow the panel 94 to be positioned horizontally. When positioned thusly, it can be seen that the semi-circular cut-outs 100 would be positioned between the bottle caps 42 and the bottle necks 38 of the bottles 36 on one side of the carrier. Since the panels 94 and 90 have been folded along the score line 96, it will be seen that the oval-shaped holes 98 then will form a plurality of cut-outs similar to the cut-outs 100 which would be designed to engage under the bottle caps 44 between the bottle caps 44 and the necks 40 of the other row of bottles 36.

By referring to FIG. 5 of the drawing, there can be seen a plurality of bottle neck receiving openings 104 formed partially in the sloped second side panel 18 and partially in the partial inner top panel 86. In a similar manner, it can be seen that there are a plurality of bottle neck openings 106 formed partially in the sloped second side panel 20 and partially in the outer top panel 22 in the vicinity of the score line 62. When formed thusly, the bottle neck receiving openings 104 and 106 are designed to receive a portion of the bottle caps 42 and 44 as shown in FIG. 2 of the drawing so that the bottom portion 108 and 110 of the bottle caps 42 and 44 is engaged by a portion 112 and 114 of the bottle neck openings 104 and 106.

From the foregoing, it can be seen that there is provided by the Applicant's new and improved bottle carrier, a one-piece carrier which is formed having upper product separation means and lower product separation means contained integrally with the carrier. The upper product separation means in the form of panels 90 and 94 positioned accordingly as shown in FIG. 2 provides separation of the upper portion of the bottles 36 both in the longitudinal and transverse directions by means of the semi-circular cuts 100 in combination with the oval-shaped holes 98 which are bent to form semi-circular cuts. When the upper product separation means is combined with the lower product separation means in the form of the upwardly turned tabs 68, 70, 72, 74, 76 and 78, there is formed a tight package in which the bottles 36 are fixedly held in place, both at the bottoms and at the tops without touching each other whenever the outer panels are tightly positioned around the bottles and are glued together. Nevertheless, it is apparent that many changes may be made in the various panels and parts of the invention and the arrangement thereof without departing from the spirit and scope of the invention. Accordingly, the Applicant is not to be limited to the exact embodiment shown which has been shown by way of illustration only.

Having described my invention, I claim:

1. A wrap-around bottle carrier for a plurality of bottles, comprising:
   (a) a bottom panel;
   (b) a pair of vertical first side panels hingedly attached to the bottom panel;
   (c) a pair of sloped second side panels hingedly attached to the first side panels, each sloped second side panel having formed thereon a plurality of openings along the upper edge thereof for receiving a protruding portion of the caps of the bottles to be retained in the carrier;
   (d) an outer top panel hingedly attached to one of the second side panels and having a handle means;
   (e) a partial inner top panel hingedly attached to the other of the second side panels and fixedly attached to a portion of the underside of the outer top panel;
   (f) an upper product separation means hingedly attached to the partial inner top panel, the upper product separation means comprising first and second separator panels hingedly attached to each other along a fold line, the first separator panel extending downwardly from and beneath the inner top panel and the second separator panel extending parallel to and spaced below the outer and inner top panels, a series of generally oval shaped openings aligned with the fold line and located partially on the first separator panel and partially on the second separator panel, and a series of generally semi-circular cutouts along a free edge of the second separator panel, for positioning between the caps and the necks of the bottles to be contained in the carrier to separate the bottles both longitudinally and transversely in the carrier; and
   (g) a lower product separation means comprising a plurality of tabs hingedly attached to the bottom panel and designed to be positioned vertically between the bottles to be contained in the carrier in order to provide both longitudinal and transverse bottle separation in the carrier.

2. The wrap-around bottle carrier as defined in claim 1 further comprising the carrier having formed thereon end flap means for enclosing at least a portion of the ends of the carrier whenever bottles are positioned within the carrier.

3. A production blank for a wrap-around bottle carrier for a plurality of bottles, comprising:
   (a) a bottom panel, the bottom panel having formed thereon lower product separation tabs hinged out of the bottom panel and designed to be positioned vertically between the bottles to be contained in the carrier to provide both longitudinal and transverse bottle separation;
   (b) a pair of first side panels hingedly attached to the bottom panel on opposite sides thereof;
   (c) a pair of second side panels hingedly attached to the first side panels, each second side panel having formed thereon a plurality of openings along one edge thereof for receiving the caps of the bottles to be retained in the carrier;
   (d) an outer top panel hingedly attached to one of the second side panels and having a handle means;
   (e) a partial inner top panel hingedly attached to the other of the second side panels; and
   (f) an upper product separation means hingedly attached to the partial inner top panel, the upper product separation means comprising first and second separator panels hingedly attached to each other along a fold line, the first separator panel designed to extend downwardly from and beneath the inner top panel and the second separator panel designed to extend parallel to and spaced below the outer and inner top panels when a carrier is formed, a series of generally oval shaped openings aligned with the fold line and located partially on the first separator panel and partially on the second separator panel, and a series of generally semi-circular cutouts along a free edge of the second separator panel, for receiving the caps and necks of the bottles to be contained in the carrier.

4. The production blank as defined in claim 3 further comprising the blank having formed thereon end flap means for enclosing at least a portion of the ends of the carrier whenever the bottles are positioned in the erected carrier.

* * * * *